(12) United States Patent
Jeon et al.

(10) Patent No.: US 8,852,797 B2
(45) Date of Patent: Oct. 7, 2014

(54) LITHIUM ION SECONDARY BATTERY WITH ANTI-ROTATION CAP ASSEMBLY

(75) Inventors: Ki Yuon Jeon, Youngin-si (KR); Byeong Deok Jeon, Youngin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1218 days.

(21) Appl. No.: 11/232,453

(22) Filed: Sep. 20, 2005

(65) Prior Publication Data

US 2006/0093907 A1 May 4, 2006

(30) Foreign Application Priority Data

Sep. 22, 2004 (KR) .................. 10-2004-0076138

(51) Int. Cl.
| H01M 2/04 | (2006.01) |
| H01M 2/10 | (2006.01) |
| H01M 10/0525 | (2010.01) |
| H01M 10/0587 | (2010.01) |
| H01M 2/30 | (2006.01) |
| H01M 2/06 | (2006.01) |

(52) U.S. Cl.
CPC .......... *H01M 10/0525* (2013.01); *Y02E 60/122* (2013.01); *H01M 10/0587* (2013.01); *H01M 2/30* (2013.01); *H01M 2/0404* (2013.01); *H01M 2/06* (2013.01)
USPC .......................................... 429/182; 429/175

(58) Field of Classification Search
CPC .... H01M 2/0404; H01M 2/04; H01M 2/0413
USPC .................. 429/181, 175, 176, 182
See application file for complete search history.

(56) References Cited

U.S. PATENT DOCUMENTS

| 6,562,508 B1 * | 5/2003 | Satoh et al. ..................... 429/53 |
| 2003/0194609 A1 * | 10/2003 | Nam et al. ..................... 429/181 |
| 2004/0096732 A1 * | 5/2004 | Shin et al. ....................... 429/61 |

FOREIGN PATENT DOCUMENTS

| JP | 59079965 | * 5/1984 | ............. H01M 2/12 |
| JP | 2-38723 | 3/1990 | |
| JP | 07-099045 | 4/1995 | |
| JP | 07-105919 | 4/1995 | |
| JP | 2001-196047 | 7/2001 | |
| JP | 2003-086151 | 3/2003 | |
| JP | 2003-317678 | 11/2003 | |
| KR | 20030066243 | * 8/2003 | ............. H01M 2/08 |

OTHER PUBLICATIONS

KIPO machine translation of KR20030066243, published Aug. 9, 2003, retrieved Aug. 20, 2009.*
Patent Abstracts of Japan, Publication No. 2003-317678; Publication Date: Jul. 11, 2003; in the name of Minami et al.

* cited by examiner

*Primary Examiner* — Barbara Gilliam
*Assistant Examiner* — Steven Scully
(74) *Attorney, Agent, or Firm* — Christie, Parker & Hale, LLP

(57) ABSTRACT

A lithium ion secondary battery is provided having a cap plate, an insulation plate, and a terminal plate, each shaped to prevent the terminal plate from rotating when assembling a cap assembly. The cap plate has an anti-rotation groove formed on a lower surface thereof and the insulation plate has an insulation plate protrusion formed on an upper surface thereof. When the anti-rotation groove is coupled to the insulation plate protrusion, the terminal plate may be prevented from rotating.

6 Claims, 8 Drawing Sheets

LITHIUM ION SECONDARY BATTERY WITH ANTI-ROTATION CAP ASSEMBLY

CROSS REFERENCE TO RELATED APPLICATION

This application claims priority to and the benefit of Korean Patent Application No. 10-2004-0076138 filed Sep. 22, 2004 in the Korean Intellectual Property Office, the entire content of which is incorporated herein by reference.

BACKGROUND OF THE INVENTION

1. Field of the Invention

The present invention relates to a lithium ion secondary battery, and more particularly to a lithium ion secondary battery having a cap plate, an insulation plate, and a terminal plate shaped to prevent the terminal plate from rotating when assembling a cap assembly.

2. Description of the Prior Art

As portable wireless appliances including video cameras, portable telephones, and portable computers tend to have a reduced weight while incorporating more functions, much research is conducted on secondary batteries which are used as the power source for driving the appliances. Secondary batteries include nickel cadmium batteries, nickel hydrogen batteries, nickel zinc batteries, and lithium secondary batteries. Among them, lithium secondary batteries are rechargeable and can be made in a compact size with a large capacity. In addition, lithium secondary batteries have a high operating voltage and a high energy density per unit weight. Therefore, lithium secondary batteries are widely used in the cutting-edge electronic appliance field.

FIG. 1 is an exploded perspective view showing a conventional lithium secondary battery. The lithium ion secondary battery is formed by placing an electrode assembly 112 including positive and negative electrode plates 113 and 115 and a separator 114 into a can 110 together with an electrolyte and sealing the top opening 110a of the can 110 with a cap assembly 120.

The cap assembly 120 includes a cap plate 140, an insulation plate 150, a terminal plate 160, and an electrode terminal 130. The cap assembly 120 is coupled to the top opening 110a of the can while being coupled to a separate insulation case 170 to seal the can 110.

The cap plate 140 may be made of a metal plate and may have a size and a shape corresponding to the top opening 110a of the can 110. The cap plate 140 has a first terminal through-hole 141 formed at the center thereof with a predetermined size into which the electrode terminal 130 is inserted. A gasket tube 146 is coupled to the outer surface of the electrode terminal 130 and inserted together with the electrode terminal 130 into the first terminal through-hole 141. The gasket tube 146 provides insulation between the electrode terminal 130 and the cap plate 140. The cap plate 140 has an electrolyte injection hole 142 formed on a side thereof with a predetermined size. After the cap assembly 120 is assembled to the top opening 110a of the can 110, an electrolyte is injected via the electrolyte injection hole 142, and the electrolyte injection hole is then sealed by a cap 143.

The electrode terminal 130 is coupled to a negative electrode tab 117 of the negative electrode plate 115 or to a positive electrode tab 116 of the positive electrode plate 113 and may act as a negative or positive electrode terminal.

The insulation plate 150 is made of an insulation material, such as a gasket, and is coupled to the lower surface of the cap plate 140. The insulation plate 150 has a second terminal through-hole 151 formed in a position corresponding to the first terminal through-hole 141 of the cap plate 140 so that the electrode terminal 130 may be inserted therein. The insulation plate 150 has a seating groove 152 formed on the lower surface thereof with a size corresponding to that of the terminal plate 160 so that the terminal plate 160 may be seated thereon.

The terminal plate 160 may be made of Ni metal or an alloy thereof and may be coupled to the lower surface of the insulation plate 150. The terminal plate 160 has a third terminal through-hole 161 formed in a position corresponding to that of the first terminal through-hole 141 of the cap plate 140 so that the electrode terminal 130 can be inserted therein. As the electrode terminal 130 is coupled to the terminal plate 160 via the first terminal through-hole 141 of the cap plate 140 while being insulated by the gasket tube 146, the terminal plate 160 is electrically connected to the electrode terminal 130 while being electrically insulated from the cap plate 140.

When the electrode terminal 130 is coupled to the cap plate 140, insulation plate 150, and terminal plate 160, a predetermined force is applied to the electrode terminal 130 while rotating it so that it is inserted into the first terminal through-hole 141 of the cap plate 140. After passing through the first terminal through-hole 141, the electrode terminal 130 passes through the second and third terminal through-holes 151 and 161 formed on the insulation plate 150 and terminal plate 160, respectively, which are coupled to the lower surface of the cap plate 140. The inner diameter of the second terminal through-hole 151 formed on the insulation plate 150 is equal to or slightly larger than the outer diameter of the electrode terminal 130 insertable therein, so that the outer surface of the electrode terminal 130 is forced against it during insertion. As a result, the insulation plate 150 and terminal plate 160 may rotate about the first terminal through-hole 141 of the cap plate 140 in such a direction that they are uncoupled when the electrode terminal 130 is inserted therein. Particularly, the inner diameter of the third terminal through-hole 161 formed on the terminal plate 160 is slightly larger than the outer diameter of the electrode terminal 130 and the terminal plate 160 is likely to rotate when the electrode terminal 130 is coupled thereto.

In order to couple the assembled cap assembly 120 to the insulation case 170, the insulation plate 150 and terminal plate 160 must be again rotated about the electrode terminal 130 in the opposite direction so that they are arranged in the same direction as the cap plate 140. Such additional work lengthens the process time.

In addition, the terminal plate 160 may partially deform when rotated in the opposite direction because it is made of a thin metal plate.

Accordingly, there is a need for a lithium ion secondary battery having a cap plate, an insulation plate, and the terminal plate shaped to prevent a terminal plate from rotating when assembling a cap assembly.

SUMMARY OF THE INVENTION

A lithium ion secondary battery is provided including an electrode assembly having positive and negative electrode plates and a separator; a can for containing the electrode assembly and an electrolyte; and a cap assembly having a cap plate, an insulation plate, a terminal plate, and an electrode terminal and coupled to a top opening of the can to seal it, wherein the insulation plate is non-rotatably coupled to the cap pate, and the terminal plate is coupled to the insulation plate to prevent the terminal plate from rotating when the electrode terminal is assembled to a terminal through-hole of the cap assembly.

BRIEF DESCRIPTION OF THE DRAWINGS

FIG. 3b is a sectional view taken along line A-A of FIG. 3a.

FIG. 4b is a sectional view taken along line B-B of FIG. 4a.

FIG. 5b is a sectional view taken along line CC of FIG. 5a.

FIG. 9b is a sectional view taken along line D-D of FIG. 9a.

DETAILED DESCRIPTION

Figure 1:
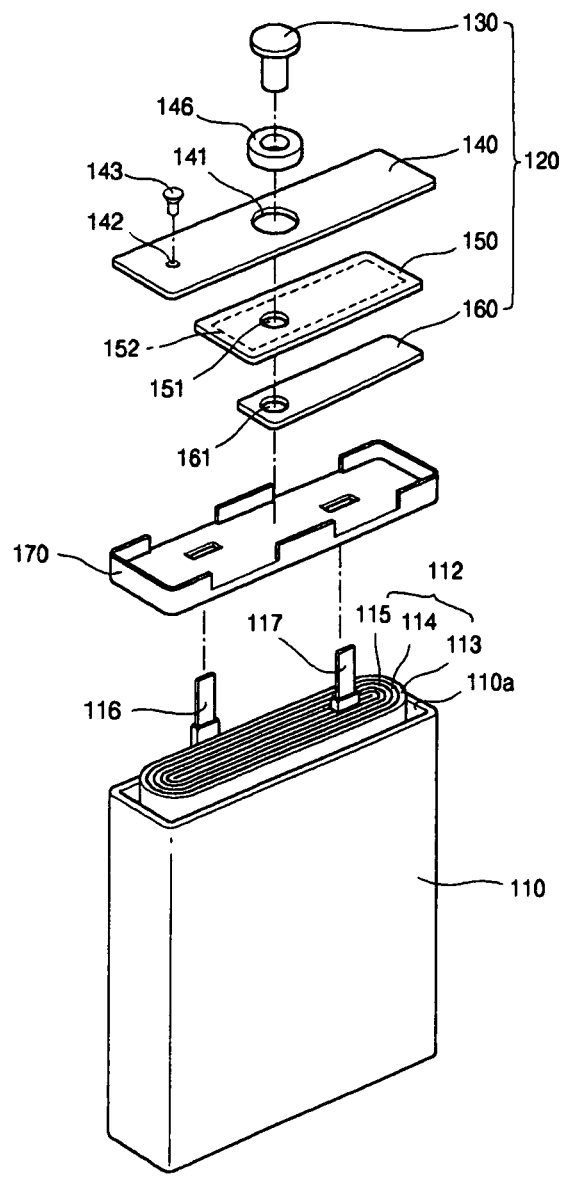
FIG. 1 is an exploded perspective view showing a conventional secondary battery.
Figure 2:
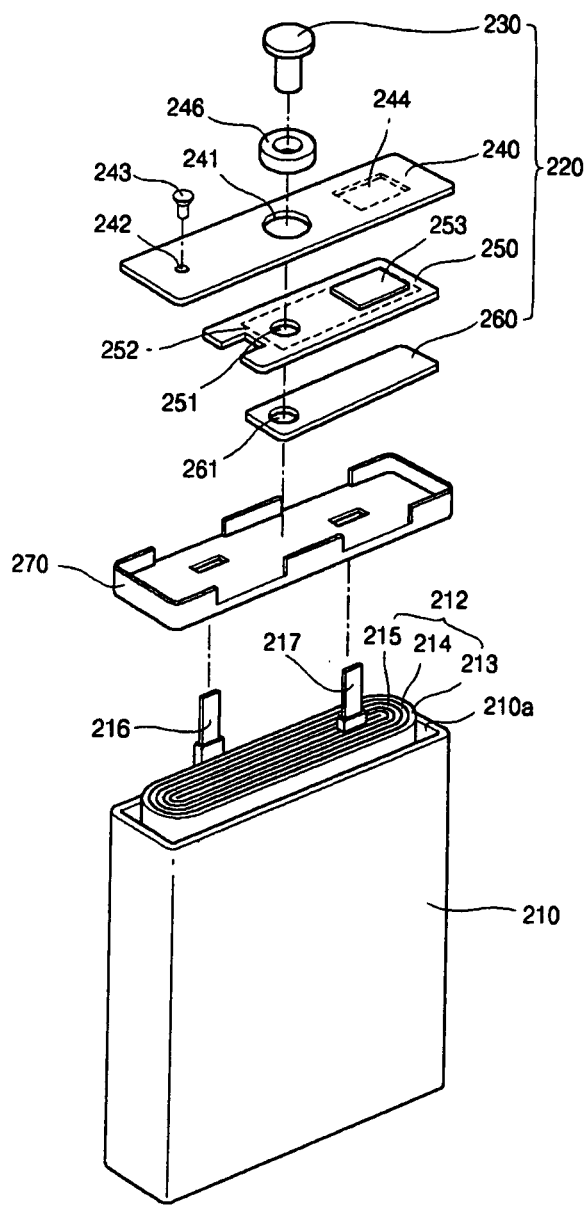
FIG. 2 is an exploded perspective view showing a secondary battery according to an exemplary embodiment of the present invention.

Referring to FIG. 2, a secondary battery includes a can 210, an electrode assembly 212 contained in the can 210, and a cap assembly 220 for sealing the top opening 210a of the can 210.

The can 210 may be made of a metallic material approximately in the shape of a hexahedron and may act as a terminal. The can 210 may be made from light aluminum or an aluminum alloy. The can 210 has a top opening 210a formed on a surface thereof, through which the electrode assembly 212 is insertable.

The electrode assembly 212 includes a positive electrode plate 213, a negative electrode plate 215, and a separator 214. The positive and negative electrode plates 213, 215 may be laminated to each other with the separator 214 interposed between them and wound into a jelly roll configuration. The positive electrode plate 213 has a positive electrode tab 216 welded thereto, the end of which protrudes from the top of the electrode assembly 212. The negative electrode plate 215 has a negative electrode tab 217 welded thereto, the end of which protrudes from the top of the electrode assembly 212.

The cap assembly 220 includes a cap plate 240, an insulation plate 250, a terminal plate 260, and an electrode terminal 230. The cap assembly 220 is coupled to the top opening 210a of the can 210 while being coupled to a separate insulation case 270 to seal the can 210.

Figure 3A:
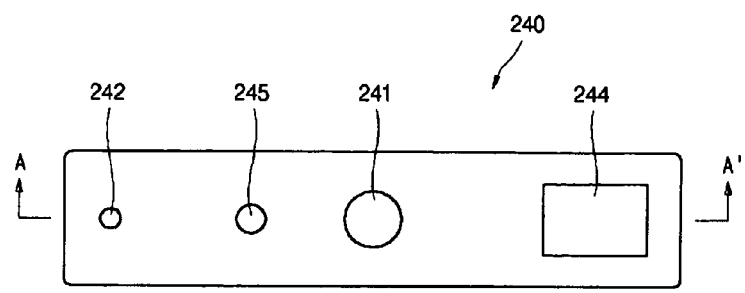
FIG. 3a is a bottom view showing a cap plate according to an exemplary embodiment of the present invention.
Figure 3B:
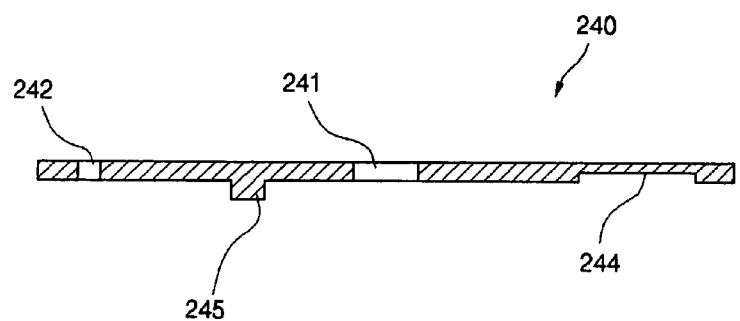

Referring to FIGS. 3a and 3b, the cap plate 240 is made from a metal plate and may have a size and a shape corresponding to the top opening 210a of the can 210. The cap plate 240 has a fourth terminal through-hole 241 formed at the center thereof with a predetermined size, into which the electrode terminal 230 is inserted and coupled. The fourth terminal through-hole 241 has a gasket tube 246 assembled to the inner surface thereof for insulation between the electrode terminal 230 and the cap plate 240.

The cap plate 240 has an anti-rotation groove 244 formed on the lower surface of a side of the cap plate about the fourth terminal through-hole 241 and an optional coupling tip 245 formed in a predetermined position on the other side thereof.

The anti-rotation groove 244 is formed by indenting a lower surface of a side of the cap plate 240 about the fourth terminal through-hole 241 towards the upper surface thereof. The anti-rotation groove 244 may have various shapes, including a square or a circle. The anti-rotation groove 244 has a length corresponding to between about 10-40% of that of the cap plate 240 and a width corresponding to at least about 40% of that of the cap plate 240. If the length or width of the anti-rotation groove 244 is too small, it may not be able to fully retain the insulation plate 250, and if the length of the anti-rotation groove 244 is too large, the overall thickness thereof is too small relative to its size and the strength weakens. The anti-rotation groove 244 may also be formed by machining instead of by indenting.

The anti-rotation groove 244 may have a depth large enough to prevent the insulation plate 250 from rotating, taking into account the size of the contact surface between the cap plate 240 and insulation plate 250. The anti-rotation groove 244 has a depth corresponding to between about 20-70% of the thickness of the cap plate 240, and in one exemplary embodiment, between about 30-50% of the thickness of the cap plate. If the depth of the anti-rotation groove 244 is too small, it may not be able to fully retain the insulation plate 250 and, if too large, the strength of the cap plate 240 may be too weak.

The anti-rotation groove 244 may have a depth of at least 0.3 mm. If the depth of the anti-rotation groove is less than 0.3 mm, the insulation plate 250 may not be able to be fully fixed to the anti-rotation groove 244.

When the insulation plate 250 is inserted into the anti-rotation groove 244, the overall thickness of the cap assembly 220 decreases, increasing the amount of inner space of the can 210. As the inner space of the can 210 increases, it is possible to suppress the increase in pressure due to gas generated when the secondary battery is used.

The cap plate 240 has an electrolyte injection hole 242 formed on the other side thereof with a predetermined size. After the cap assembly 220 is assembled to the top opening 210a of the can 210, an electrolyte is injected through the electrolyte injection hole 242 which is then sealed by a cap 243.

The coupling tip 245 protrudes a predetermined height in a position between the fourth terminal through-hole 241 and the electrolyte injection hole 242. In one exemplary embodiment, the height of the coupling tip 245 is equal to or smaller than the height of the insulation plate 250 so that when the insulation plate 250 is coupled thereto, the coupling tip does not protrude from the lower surface of the insulation plate 250.

Figure 4A:
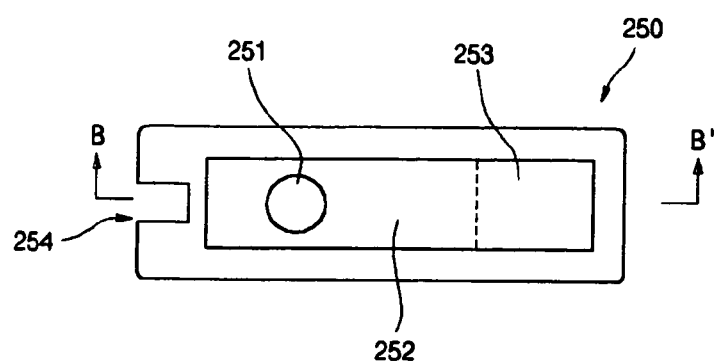
FIG. 4a is a bottom view showing an insulation plate according to an exemplary embodiment of the present invention.
Figure 4B:
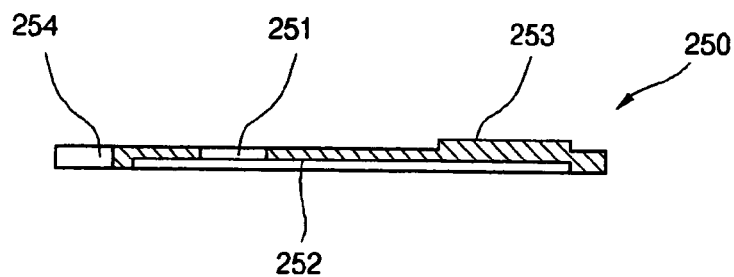

Referring to FIGS. 4a and 4b, the insulation plate 250 is made of an insulation material, such as a gasket, and is coupled to the lower surface of the cap plate 240. The insulation plate 250 includes a fifth terminal through-hole 251, a seating groove 252, an insulation plate protrusion 253, and a coupling groove 254.

The fifth terminal through-hole 251 is positioned to face the fourth terminal through-hole 241 of the cap plate 240 when the insulation plate 250 and the cap plate 240 are coupled to each other. The electrode terminal 230 is insertable into the fifth terminal through-hole 251.

The seating groove 252 is formed on the lower surface of the insulation plate 250 with a size corresponding to that of the terminal plate 260. In one exemplary embodiment, the seating groove 252 has a depth smaller than the thickness of the terminal plate 260.

The insulation plate protrusion 253 protrudes from the upper surface of the insulation plate 250 and has a height and a size suitable to be coupled to the anti-rotation groove 244 and fixed thereto. If the height and size of the insulation plate protrusion 253 are substantially larger or smaller than the depth and shape of the anti-rotation groove 244, the coupling between the insulation plate protrusion 253 and the anti-rotation groove 244 may be insufficient to retain the insulation plate 250 and/or prevent the insulation plate from rotating.

The insulation plate 250 may have a coupling groove 254 formed on one side thereof while being positioned to face the coupling tip 245 formed on the lower surface of the cap plate 240 so that the coupling tip 245 is inserted and coupled to the coupling groove. Coupling the coupling groove 254 of the insulation plate 250 and the coupling tip 245 of the cap plate 240 results in the insulation plate 250, and ultimately the terminal plate 260 being prevented from rotating relative to the cap plate 240 when the electrode terminal 230 is inserted into the fifth terminal through-hole 251.

Figure 5A:
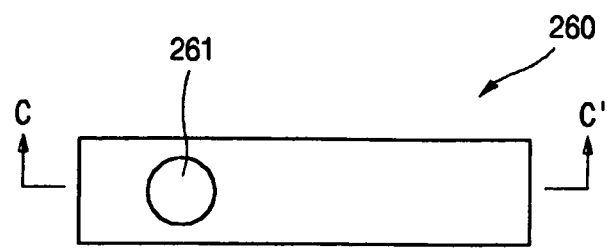
FIG. 5a is a top view showing a terminal plate according to an exemplary embodiment of the present invention.
Figure 5B:

Referring to FIGS. 5a and 5b, the terminal plate 260 has the shape of a plate and is made of Ni metal or its alloy. The terminal plate 260 is seated in the seating groove formed on the lower surface of the insulation plate 250 and is fixed thereto. As such, the terminal plate 260 is coupled to the insulation plate 250 and is movable together with it. The terminal plate 260 has a sixth terminal through-hole 261 positioned to face the fourth terminal through-hole 241 of the cap plate 240 so that the electrode terminal 230 may be inserted therein. The terminal plate 260 is electrically connected to the electrode terminal 230 while being insulated from the cap plate 240 by the insulation plate 250.

The electrode terminal 230 is inserted into the terminal through-holes 241, 251, 261 formed on the cap plate 240, insulation plate 250, and terminal plate 260, respectively, and passes through the terminal plate 260 to be electrically connected to the negative electrode tab 217 of the electrode assembly 212. When inserted into the fourth terminal through-hole 241 of the cap plate 240, the electrode terminal 230 is electrically insulated from the cap plate 240 by the gasket tube 246. It will be apparent to those skilled in the art that the positive electrode tab 216 may be alternatively connected to the electrode terminal 230 using the method for forming the electrode assembly 212.

Figure 6:
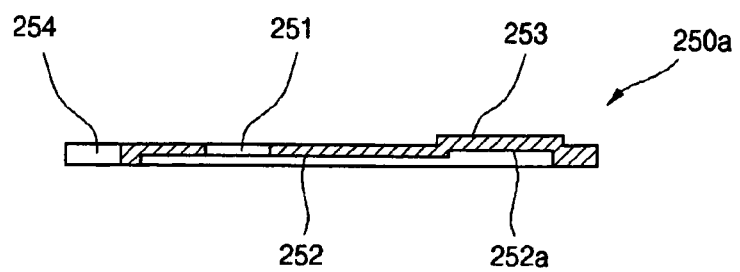
FIG. 6 is a sectional view showing an insulation plate according to another exemplary embodiment of the present invention.

Referring to FIG. 6, an alternate embodiment of the insulation plate 250a has a fixing groove 252a formed in a predetermined position on the seating groove 252. Specifically, the fixing groove 252a may be formed in a position corresponding to that of the insulation plate protrusion 253 with a size corresponding to that of the insulation plate protrusion.

Figure 7:
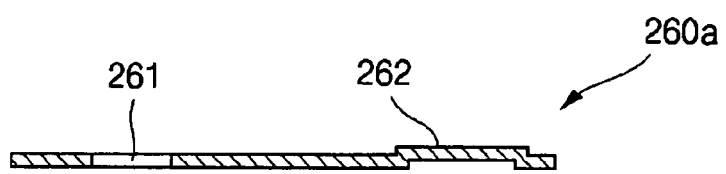
FIG. 7 is a sectional view showing a terminal plate according to another exemplary embodiment of the present invention.

Referring to FIG. 7, the terminal plate 260a has an anti-rotation protrusion 262 formed on the upper surface thereof with a size corresponding to that of the fixing groove 252a formed on the lower surface of the insulation plate 250a.

Because the anti-rotation protrusion 262 is coupled to the fixing groove 252a, the terminal plate 260a is further prevented from rotating relative to the insulation plate 250a.

As such, the fixing groove 252a and anti-rotation protrusion 262 prevent the insulation plate 250 and terminal plate 260 from rotating relative to the cap plate 240 in a twofold manner.

Figure 8:
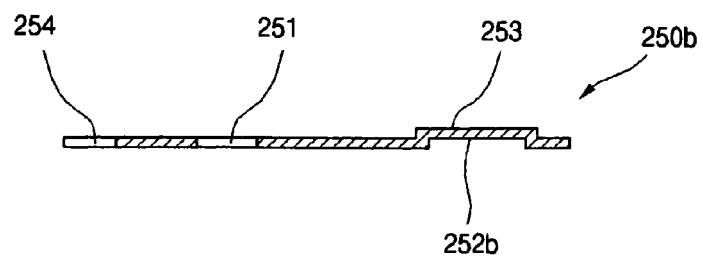
FIG. 8 is a sectional view showing an insulation plate according to another exemplary embodiment of the present invention.

Referring to FIG. 8, the insulation plate 250b has the general shape of a rectangle. Without a separate seating groove, the insulation plate 250b has an insulation plate protrusion 253 formed on the upper surface thereof and a fixing groove 252b formed in a predetermined position on the lower surface thereof. The insulation plate protrusion 253 may be coupled to the anti-rotation groove of the cap plate. The fixing groove 252b has a size and a shape corresponding to the anti-rotation groove 244 of the cap plate 240 so that the anti-rotation protrusion 262 of the terminal plate 260a shown in FIG. 7 may be coupled thereto. As such, the terminal plate 260a is fixed to the insulation plate 250b, which is coupled and fixed to the anti-rotation groove 244 of the cap plate 240, and the terminal plate 260a is prevented from rotating relative to the cap plate 240.

The operation of the cap assembly included in the secondary battery according to an exemplary embodiment of the present invention will now be described.

Figure 9A:
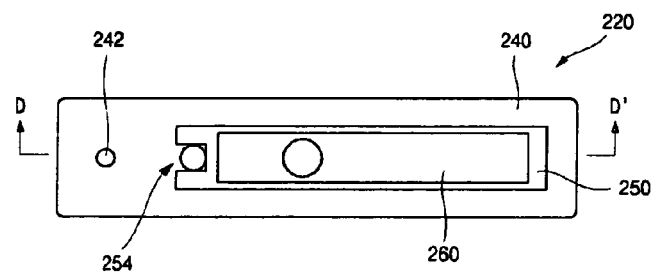
FIG. 9a is a bottom view showing a cap assembly having the cap plate, insulation plate, and terminal plate shown in FIGS. 3a, 4a, and 5a, respectively, coupled thereto.
Figure 9B:
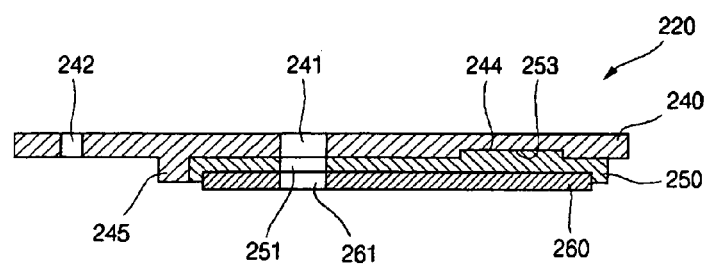

Referring to FIGS. 9a and 9b, the cap plate 240, insulation plate 250, and terminal plate 260 are laminated on the cap assembly 220 in such a manner that their respective terminal through-holes 241, 251, and 261 are concentric with one another. The electrode terminal 230 is coupled to and fixed to the terminal through-holes 241, 251, and 261. The insulation plate protrusion 253 formed on the upper surface of the insulation plate 250 is coupled to the anti-rotation groove 244 formed on the lower surface of the cap plate 240. The terminal plate 260 is seated in the seating groove 252 formed on the lower surface of the insulation plate 250. The coupling groove 254 of the insulation plate 250 is coupled to the coupling tip 245 formed on the other side of the cap plate 240.

The electrode terminal 230 is inserted into and coupled to the fourth terminal through-hole 241 of the cap plate 240 laminated as shown in FIG. 9a, while being rotated by a uniform force. After passing through the fourth terminal through-hole 241, the electrode terminal 230 passes through the fifth and sixth terminal through-holes 251 and 261 of the insulation plate 250 and terminal plate 260, respectively, which are coupled to the lower surface of the cap plate 240. The inner diameter of the fifth and sixth terminal through-holes 251, 261 formed on the insulation plate 250 and terminal plate 260, respectively, is equal to or slightly larger than the outer diameter of the electrode terminal 230. As a result, friction occurs between the respective terminal through-holes 251, 261 of the insulation plate 250 and terminal plate 260 and the electrode terminal 230 when the electrode terminal is inserted therein. Although rotational forces may be applied to the insulation plate 250 and terminal plate 260, the insulation plate protrusion 253 of the insulation plate 250 coupled to the anti-rotation groove 244 of the cap plate 240 and the terminal plate 260 coupled to the seating groove 252 of the insulation plate 250 prevent the insulation plate 250 and terminal plate 260 from rotating. In addition, the coupling tip 245 of the cap plate 240 and the coupling groove 254 of the insulation plate 250 are coupled to each other to prevent the insulation plate 240 from rotating.

Figure 10:
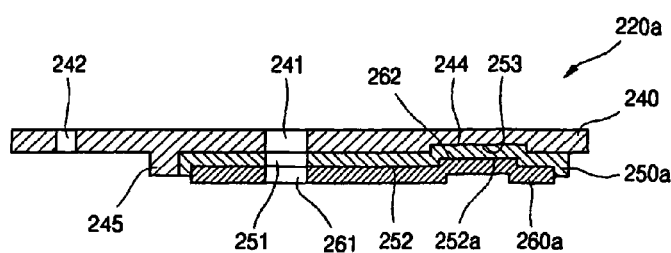
FIG. 10 is a sectional view showing a cap assembly having the cap plate, insulation plate, and terminal plate shown in FIGS. 3a, 6, and 7, respectively, coupled thereto.

Referring to FIG. 10, the cap plate 240, insulation plate 250a, and terminal plate 260a are laminated on the cap assembly 220a in such a manner that their respective terminal through-holes 241, 251, 261 are concentric with one another.

The electrode terminal 230 is coupled and fixed to the terminal through-holes 241, 251, 261. The insulation plate protrusion 253 formed on the upper surface of the insulation plate 250a is coupled to the anti-rotation groove 244 formed on the lower surface of the cap plate 240. The terminal plate 260a is seated in the seating groove 252 formed on the lower surface of the insulation plate 250a. The insulation plate 250a has an additional fixing groove 252a formed on the seating groove 252 thereof, to which the anti-rotation protrusion 262 formed on the upper surface of the terminal plate 260a is coupled. As a result, the insulation plate 250a and terminal plate 260a do not rotate relative to the cap plate 240 and remain stationary, even when the electrode terminal 230 is coupled thereto.

Figure 11:
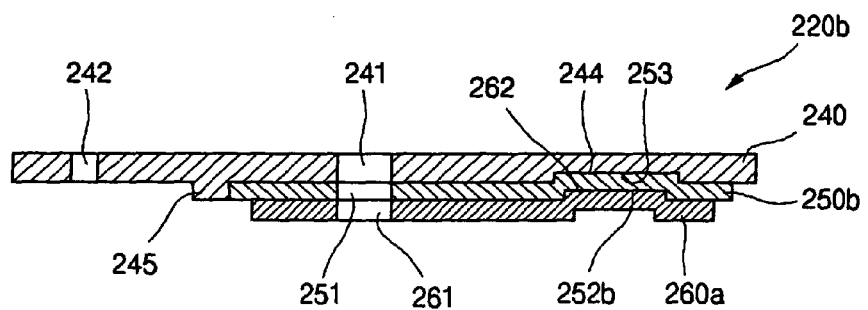
FIG. 11 is a sectional view showing a cap assembly having the cap plate, insulation plate, and terminal plate shown in FIGS. 3a, 8, and 7, respectively, coupled thereto.

Referring to FIG. 11, the cap plate 240, insulation plate 250b, and terminal plate 260a are laminated on the cap assembly 220b in such a manner that their respective terminal through-holes 241, 251, 261 are concentric with one another. The electrode terminal 230 is coupled and fixed to the terminal through-holes 241, 251, 261. The insulation plate protrusion 253 formed on the upper surface of the insulation plate 250b is coupled to the anti-rotation groove 244 formed on the lower surface of the cap plate 240. The terminal plate 260a is seated on the lower surface of the insulation plate 250b. The ant-rotation protrusion 262 formed on the upper surface of the terminal plate 260a is coupled to the fixing groove 252b formed on the lower surface of the insulation plate 250b. As a result, the insulation plate 250b and terminal plate 260a do not rotate relative to the cap plate 240 and remain stationary, even when the electrode terminal 230 is coupled thereto.

The secondary battery according to exemplary embodiments provides for a battery that, the present invention, when the electrode terminal is inserted into the cap plate, insulation plate, and terminal plate to form a cap assembly, the terminal plate is prevented from rotating relative to the cap plate, making it easier to assemble the cap assembly.

In addition, because the insulation plate and terminal plate do not rotate when the electrode terminal is inserted, and because they do not need to be rotated in the opposite direction, the terminal plate is prevented from deforming.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium ion secondary battery comprising:
an electrode assembly having a positive electrode plate, a negative electrode plate and a separator;
a can containing the electrode assembly and an electrolyte;
a cap assembly including a cap plate having a terminal through-hole, an insulation plate, a terminal plate, and an electrode terminal, the cap assembly coupled to an insulation case and the can;
wherein an anti-rotation groove is on a first surface of the cap plate on a first side of the terminal through-hole and is recessed from the cap plate in a direction away from the electrode assembly, wherein the anti-rotation groove has a substantially square shape with a length corresponding to between about 10-40% of a length of the cap plate and a width corresponding to at least 40% of a width of the cap plate;
wherein an insulation plate protrusion is on a second surface of the insulation plate facing the first surface and protrudes from the insulation plate in the first direction, the insulation plate protrusion coupled to the anti-rotation groove,
wherein a seating groove is on the insulation plate;
wherein a fixing groove is on the seating groove;
wherein the terminal plate has an anti-rotation protrusion that is seated in the fixing groove in the seating groove of the insulation plate; and
wherein a coupling tip spaced from the anti-rotation groove protrudes from the first surface of the cap plate on a second side of the terminal through-hole and is coupled to a coupling groove spaced from the insulation plate protrusion on the second surface of the insulation plate; and
wherein at least a portion of the insulation plate protrusion and the anti-rotation protrusion of the terminal plate at least partially overlap each other in the first direction.

2. The lithium ion secondary battery as claimed in claim 1, wherein the insulation plate protrusion has an area generally corresponding to an area of the anti-rotation groove.

3. The lithium ion secondary battery as claimed in claim 1, wherein the anti-rotation groove has a depth of between about 20% and about 70% of a thickness of the cap plate.

4. The lithium ion secondary battery as claimed in claim 1, wherein the anti-rotation groove has a depth corresponding to between about 30% and about 50% of a thickness of the cap plate.

5. The lithium ion secondary battery as claimed in claim 1, wherein the anti-rotation groove has a depth of at least 0.3 mm.

6. The lithium ion secondary battery as claimed in claim 1, wherein the anti-rotation groove is an indentation.

* * * * *